(12) United States Patent
Zhang et al.

(10) Patent No.: US 7,956,862 B2
(45) Date of Patent: Jun. 7, 2011

(54) DETERMINING CAMERA MOTION

(75) Inventors: Tong Zhang, Framingham, MA (US);
Janos Rohaly, Acton, MA (US); Steven V. Weeks, North Andover, MA (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/568,124

(22) Filed: Sep. 28, 2009

(65) Prior Publication Data
US 2010/0013909 A1    Jan. 21, 2010

Related U.S. Application Data

(63) Continuation of application No. 11/270,135, filed on Nov. 9, 2005, now Pat. No. 7,605,817.

(51) Int. Cl.
*G06T 15/00* (2006.01)

(52) U.S. Cl. ........ 345/473; 345/474; 345/475; 345/419; 382/107; 382/154; 382/285; 348/169; 356/12

(58) Field of Classification Search .................. 345/419, 345/473, 474, 475; 382/107, 154, 285; 348/169; 356/12
See application file for complete search history.

(56) References Cited

U.S. PATENT DOCUMENTS

| 6,201,541 | B1 | 3/2001 | Shalom et al. | |
|---|---|---|---|---|
| 6,639,594 | B2 | 10/2003 | Zhang et al. | |
| 6,834,119 | B2 | 12/2004 | Chen | |
| 6,950,550 | B1 | 9/2005 | Sumi et al. | |
| 6,954,202 | B2 | 10/2005 | Han et al. | |
| 7,019,748 | B2 | 3/2006 | Raskar | |
| 7,605,817 | B2 * | 10/2009 | Zhang et al. | 345/473 |

FOREIGN PATENT DOCUMENTS

WO    WO 2007/056768    5/2007

OTHER PUBLICATIONS

Arun, K. S., et al., "Least-Squares Fitting of Two 3-D Point Sets", IEEE Transactions on Pattern Analysis and Machine Intelligence vol. PAMI-9. No. 5, pp. 698-700 (Sep. 1987).
Besl, Paul J., et al., "A Method for Registration of 3-D Shapes", IEEE Transactions on Pattern Analysis and Machine Intelligence. vol. 14. No. 2, pp. 239-256. (Feb. 1992).
Horn, Berthold K., et al., "Closed-form solution of absolute orientation using orthonormal matrices", Journal of the Optical Sociate of America A. vol. 5, pp. 1127-1135. (Jul. 1988).
Molton, Nicholas, et al., "Practical Structure and Motion from Stereo When Motion is Unconstrained", Department of Engineering Science, University of Oxford,(Mar. 30, 2000).
Tomasi, Carlos, et al., "Shape and Motion from Image Streams under Orthography: a Factorization Method", International Journal of Computer Vision. 9:2 137-154 (1992).

\* cited by examiner

*Primary Examiner* — Phu Nguyen

(57) ABSTRACT

Camera motion is determined in a three-dimensional image capture system using a combination of two-dimensional image data and three-dimensional point cloud data available from a stereoscopic, multi-aperture, or similar camera system. More specifically, a rigid transformation of point cloud data between two three-dimensional point clouds may be more efficiently parameterized using point correspondence established between two-dimensional pixels in source images for the three-dimensional point clouds.

13 Claims, 4 Drawing Sheets

DETERMINING CAMERA MOTION

CROSS REFERENCE TO RELATED APPLICATIONS

This application is a continuation of U.S. Ser. No. 11/270,135, filed Nov. 9, 2005 now U.S. Pat. No. 7,605,817, now allowed, the disclosure of which is incorporated by reference in its entirety herein.

BACKGROUND

1. Field of the Invention

This invention relates to determination of camera motion, and more particularly to determination of camera motion in a three-dimensional imaging system.

2. Description of the Related Art

Three-dimensional image capture has long held promise as a data acquisition technique for a wide range of modeling systems including computer-aided design systems, digital animation systems, medical imaging systems, graphical design and artwork systems, and the like.

One general technique for capturing three-dimensional data reconstructs an aggregate three-dimensional point cloud using sequential images from a moving camera, which raises the complementary problem of determining camera motion from image to image. A common approach to recovery of camera motion for these image sequences employs factorization on established point correspondences between two-dimensional images. However, this technique is computationally intensive because point correspondence must be maintained over a number of sequential images. This raises additional difficulties in real imaging environments where particular points may be obstructed, or fall entirely out of the image plane.

Another general technique for capturing three-dimensional data employs camera hardware that can directly capture a three-dimensional point cloud by triangulating corresponding points in sets of two-dimensional images from a stereoscopic or multi-aperture device. For these three-dimensional cameras, camera motion can be determined using three-dimensional registration of sequential three-dimensional point clouds. However, typical registration techniques such as the iterative closest point ("ICP") method do not perform well with difficult-to-register surfaces, such as planar regions. Further, iterative solutions are, in general, poorly suited to real-time imaging applications due to the requirement for multiple, successive calculations, frequently with large data sets.

There remains a need for a robust, efficient technique for determining camera motion that is suitable for use in applications such as real time, three-dimensional image capture.

SUMMARY

Camera motion is determined in a three-dimensional image capture system using a combination of two-dimensional image data and three-dimensional point cloud data available from a stereoscopic, multi-aperture, or similar camera system. More specifically, a rigid transformation of point cloud data between two three-dimensional point clouds may be more efficiently parameterized using point correspondence established between two-dimensional pixels in source images for the three-dimensional point clouds.

In one aspect, a method disclosed herein includes receiving a first image set, the first image set including a first plurality of two-dimensional views of a subject from a first position; receiving a second image set, the second image including a second plurality of two-dimensional views of a subject from a second position; deriving a first point cloud from the first image set; identifying a number of corresponding pixels between a number of pixels of one of the first plurality of two-dimensional views and a number of pixels of one of the second plurality of two-dimensional views; deriving a second point cloud from the number of corresponding pixels of the second image set; and determining a motion from the first position to the second position using the first point cloud and the second point cloud.

Determining motion may include determining a rigid transformation from the first point cloud to the second point cloud. The first point cloud may be derived from a number of pixels of the first image set using stereo matching. The motion may include a change in at least one of a position or an orientation. The first point may include a subset of points from the first image set. The method may further include deriving the subset of points from a sparse mesh of pixels within the first image set. The second point cloud may include a subset of points from the second image set. The subject may be substantially larger than an image plane of the first image set, and the method may further include repeating the steps of the method for a plurality of consecutive three-dimensional images, whereby an aggregate point cloud is constructed for the subject. If one of the plurality of consecutive motions cannot be determined directly from point cloud data of consecutive views, the method may further include recovering the one of the plurality of consecutive motions through an inverse transformation of one or more next consecutive motions for one or more next consecutive point clouds. The method may include supplementing the first point cloud with one or more additional points from the first image set having one or more additional corresponding points in the second image set. The method may include supplementing the second point cloud with one or more additional points from the second image set having one or more additional corresponding points in the first image set. The first image set and the second image set may be obtained from a multi-aperture camera.

Identifying one or more corresponding pixels may include identifying corresponding pixels between two-dimensional views from a center aperture of the multi-aperture camera. The first image set and the second image set may be obtained from a camera system including a plurality of cameras in a fixed relationship to one another.

The subject may include a body part. The body part may include a nose or an ear. The subject may include one or more teeth. The subject may include a model of one or more teeth. The subject may include a physical model of an object for use in a digital animation process.

In another aspect, a computer program product disclosed herein includes computer code which, when executed on a computer, performs the following steps: receiving a first image set, the first image set including a first plurality of two-dimensional views of a subject from a first position; receiving a second image set, the second image including a second plurality of two-dimensional views of a subject from a second position; deriving a first point cloud from the first image set; identifying a number of corresponding pixels between a number of pixels of one of the first plurality of two-dimensional views and a number of pixels of one of the second plurality of two-dimensional views; deriving a second point cloud from the number of corresponding pixels of the second image set; and determining a motion from the first position to the second position using the first point cloud and the second point cloud.

Determining motion may include determining a rigid transformation from the first point cloud to the second point cloud. The first point cloud may be derived from a number of pixels of the first image set using stereo matching. The motion may include a change in at least one of a position or an orientation. The first point may include a subset of points from the first image set. The computer code may further include code for deriving the subset of points from a sparse mesh of pixels within the first image set. The second point cloud may include a subset of points from the second image set. The subject may be substantially larger than an image plane of the first image set, and the computer code may further include code for repeating for a plurality of consecutive three-dimensional images, whereby an aggregate point cloud is constructed for the subject. If one of the plurality of consecutive motions cannot be determined directly from point cloud data of consecutive views, the computer code may further include code for recovering the one of the plurality of consecutive motions through an inverse transformation of one or more next consecutive motions for one or more next consecutive point clouds. The computer code may include code for supplementing the first point cloud with one or more additional points from the first image set having one or more additional corresponding points in the second image set. The computer code may include code for supplementing the second point cloud with one or more additional points from the second image set having one or more additional corresponding points in the first image set. The first image set and the second image set may be obtained from a multi-aperture camera.

Identifying one or more corresponding pixels may include identifying corresponding pixels between two-dimensional views from a center aperture of the multi-aperture camera. The first image set and the second image set may be obtained from a camera system including a plurality of cameras in a fixed relationship to one another.

The subject may include a body part. The body part may include a nose or an ear. The subject may include one or more teeth. The subject may include a model of one or more teeth. The subject may include a physical model of an object for use in a digital animation process.

In another aspect a system disclosed herein may include a camera and a processor. The camera may be configured to capture a first image set including a first plurality of two-dimensional views of a subject from a first position and a second image set including a second plurality of two-dimensional views of a subject from a second position. The processor may be coupled in a communicating relationship with the camera, the processor configured to derive a first point cloud from the first image set, identify a number of corresponding pixels between a number of pixels of one of the first plurality of two-dimensional views and a number of pixels of one of the second plurality of two-dimensional views, and derive a second point cloud from the number of corresponding pixels of the second image set, the processor further configured to determine a motion from the first position to the second position using the first point cloud and the second point cloud.

Determining motion may include determining a rigid transformation from the first point cloud to the second point cloud. The first point cloud may be derived from a number of pixels of the first image set using stereo matching. The motion may include a change in at least one of a position or an orientation. The first point may include a subset of points from the first image set. The processor may be configured to derive the subset of points from a sparse mesh of pixels within the first image set. The second point cloud may include a subset of points from the second image set. The subject may be substantially larger than an image plane of the first image set, and the processor may be configured to derive a plurality of additional point clouds and determine a plurality of consecutive motions therefrom, whereby an aggregate point cloud is constructed for the subject. If one of the plurality of consecutive motions cannot be determined directly from point cloud data of consecutive views, the processor may recover the one of the plurality of consecutive motions through an inverse transformation of one or more next consecutive motions for one or more next consecutive point clouds. The processor may be configured to supplement the first point cloud with one or more additional points from the first image set having one or more additional corresponding points in the second image set. The processor may be configured to supplement the second point cloud with one or more additional points from the second image set having one or more additional corresponding points in the first image set.

The camera may be a multi-aperture camera. Identifying one or more corresponding pixels may include identifying corresponding pixels between two-dimensional views from a center aperture of the multi-aperture camera. The camera may include a plurality of cameras in a fixed relationship to one another.

The subject may include a body part. The body part may include a nose or an ear. The subject may include one or more teeth. The subject may include a model of one or more teeth. The subject may include a physical model of an object for use in a digital animation process.

In another aspect, a method disclosed herein includes determining a motion of a camera from a first position to a second position using a rigid transformation of a point cloud from the first position to a point cloud from the second position, the point cloud from the second position comprising points selected using a correspondence of two-dimensional image data from the first position and the second position.

In another aspect, a system disclosed herein includes first receiving means for receiving a first image set, the first image set including a first plurality of two-dimensional views of a subject from a first position; second receiving means for receiving a second image set, the second image including a second plurality of two-dimensional views of a subject from a second position; deriving means for deriving a first point cloud from the first image set; first identifying means for identifying a number of corresponding pixels between a number of pixels of one of the first plurality of two-dimensional views and a number of pixels of one of the second plurality of two-dimensional views; second deriving means for deriving a second point cloud from the number of corresponding pixels of the second image set; and motion determining means for determining a motion from the first position to the second position using the first point cloud and the second point cloud.

Other features of the invention, its nature and various advantages will be apparent from the accompanying drawings and the following detailed description of certain preferred embodiments.

BRIEF DESCRIPTION OF THE FIGURES

The invention and the following detailed description of certain embodiments thereof may be understood by reference to the following figures.

DETAILED DESCRIPTION

Described below is a technique for reconstructing an aggregate three-dimensional point cloud using camera motion determinations for a series of images from a stereoscopic or multi-aperture camera system. However, it will be appreciated that the inventive concepts disclosed herein are not limited to such applications, and may be usefully employed in any imaging system, for visible light or otherwise, in which two-dimensional and three-dimensional image data is available for use in reconstruction. Thus the techniques may be employed, for example, with a multi-camera motion picture system, a stereoscopic microscope, or any other imaging system where three-dimensional data might be derived from two-dimensional images. Similarly, while the following discussion focuses on a camera that moves relative to an imaging subject, the techniques described herein are equally applicable to a stationery camera that captures sequential images of one or more moving objects. In such uses, the analytical problem may be more accurately stated as determination of object motion by a stationery camera, but such uses are conceptually similar, if not identical. Still more generally, both the camera and the subject may be moving relative some external frame of reference, without changing the problem of determining relative motion between the camera and the subject, and the applicability of the techniques described herein. All such variations and alternative embodiments as would be apparent to one of ordinary skill in the art are intended to fall within the scope of this disclosure.

In the following description, the term "image" generally refers to a two-dimensional set of pixels forming a two-dimensional view of a subject within an image plane. The term "point cloud" generally refers to a three-dimensional set of points forming a three-dimensional view of the subject reconstructed from a number of two-dimensional views. In a three-dimensional image capture system, a number of such point clouds may also be registered and combined into an aggregate point cloud constructed from images captured by a moving camera. Thus it will be understood that pixels generally refer to two-dimensional data and points generally refer to three-dimensional data, unless another meaning is specifically indicated or clear from the context.

Figure 1:
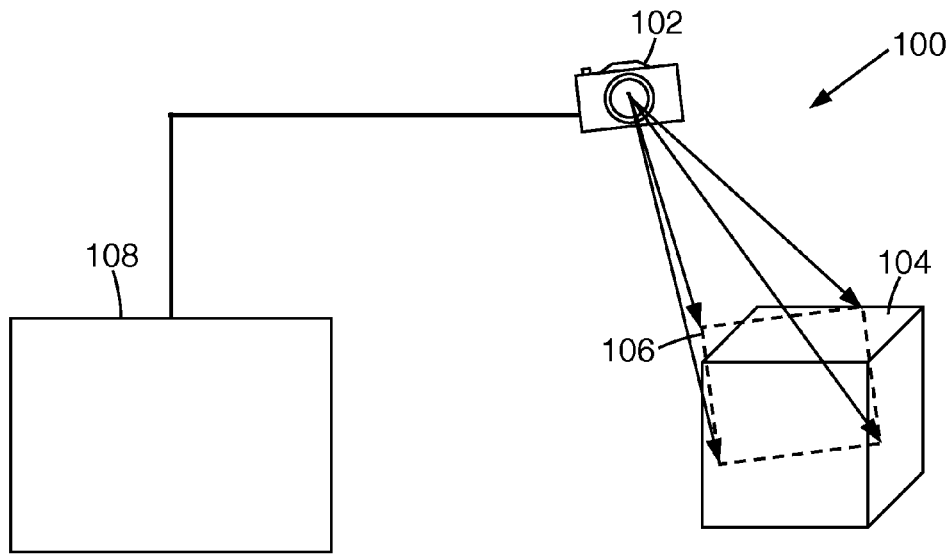
FIG. 1 shows an image capture system.

FIG. 1 shows an image capture system. In general, the system 100 may include a camera 102 that captures images of a subject 104 within an image plane 106, and forwards the images to a computer 108.

The camera 102 may be any camera or camera system suitable for capturing images from which a three-dimensional point cloud may be recovered. For example, the camera 102 may employ a multi-aperture system as disclosed, for example, in U.S. Pat. Pub. No. 20040155975 to Hart et al., the entire contents of which is incorporated herein by reference. While Hart discloses one multi-aperture system, it will be appreciated that any multi-aperture system suitable for reconstructing a three-dimensional point cloud from a number of two-dimensional images may similarly be employed. In one multi-aperture embodiment, the camera 102 may include a plurality of apertures including a center aperture positioned along a center optical axis of a lens and any associated imaging hardware. The camera 102 may also, or instead, include a stereoscopic or other multi-camera configuration in which a number of cameras are maintained in fixed relation to one another to obtain two-dimensional images of an object from a number of slightly different perspectives. The camera 102 may include suitable processing for deriving a three-dimensional point cloud from the multi-aperture or multi-camera images, or the two-dimensional images may be transmitted to an external processor such as the processor 108 described below.

Although not shown in FIG. 1, it will be appreciated that a number of supplemental lighting systems may be usefully employed during image capture. For example, environmental illumination may be enhanced with one or more spotlights illuminating the subject 104 to speed image acquisition and improve depth of field. The camera 102 may also, or instead, include a strobe, flash, or other light source to supplement illumination of the subject 104 during image acquisition.

The subject 104 may be any object, collection of objects, portion of an object, or other subject matter. For example, in a dental imaging application, the subject 104 may include a tooth, a quadrant of teeth, or a full collection of teeth from which a virtual dental impression is desired. Conversely, the subject 104 may include a dental prosthesis such as a cap, a crown, or any other portion of a tooth, which may be tested for fit within a previously captured full virtual dental impression. The subject 104 may include a dental model, such as a plaster cast, wax-up, impression, or negative impression of a tooth, teeth, soft tissue, or some combination of these. In certain instances, a texturing agent may be applied to surfaces of the subject 104 to improve capture of three dimensional points. In other embodiments, the subject 104 may be a human head, or a portion thereof, from which a three-dimensional model is desired for custom fitting of a hearing aid, eyeglasses, goggles, or the like. In other embodiments, the subject 104 may be a physical model of an object for use in digital animation, such as a miniature, physical model for use in a three-dimensional digital animation process. From the preceding examples, it will be apparent that a system using the techniques described herein may be suitably adapted to a wide range of applications for relatively short range, high resolution three-dimensional image acquisition. However, one skilled in the art will appreciate that suitable adaptations to the camera 102 may be made for a variety of other three-dimensional imaging applications based upon multi-aperture or multi-camera systems, and all such variations are intended to fall within the scope of this disclosure.

The image plane 106 may include a two-dimensional field of view of the camera 102. Though illustrated as a rectangle, it will be appreciated that the image plane 106 may, for example, form a square, a circle, or any other geometry provided by the camera 102. In general, the camera 102 will have a depth of field for image acquisition within the image plane 106 determined by the physical construction of the camera 102 and environmental conditions such as ambient light.

The computer 108 may be, for example, a personal computer or other processing device. In one embodiment, the computer 108 includes a personal computer with a dual 2.8 GHz Opteron central processing unit, 2 gigabytes of random access memory, a TYAN Thunder K8WE motherboard, and a 250 gigabyte, 10,000 rpm hard drive. This system may be operated to capture approximately 1,500 points per image set in real time using the techniques described herein, and store an aggregated point cloud of over one million points. More generally, processing capabilities of the computer 108 may vary according to the size of the subject 104, the speed of image acquisition, and the desired spatial resolution of three-dimensional points. The computer 108 may also include peripheral devices such as a keyboard, monitor, and mouse for user interaction with the camera system 100.

Communications between the computer 108 and the camera 102 may use any suitable communications link including, for example, a wired connection or a wireless connection based upon, for example, IEEE 802.11 (also known as wireless Ethernet), BlueTooth, or any other suitable wireless standard using, e.g., a radio frequency, infrared, or other wireless communication medium. In medical imaging or other sensitive applications, wireless image transmission from the camera 102 to the computer 108 may be secured. The computer 108 may generate control signals to the camera 102 which, in addition to image acquisition commands, may include conventional camera controls such as focus or zoom.

Figure 2:
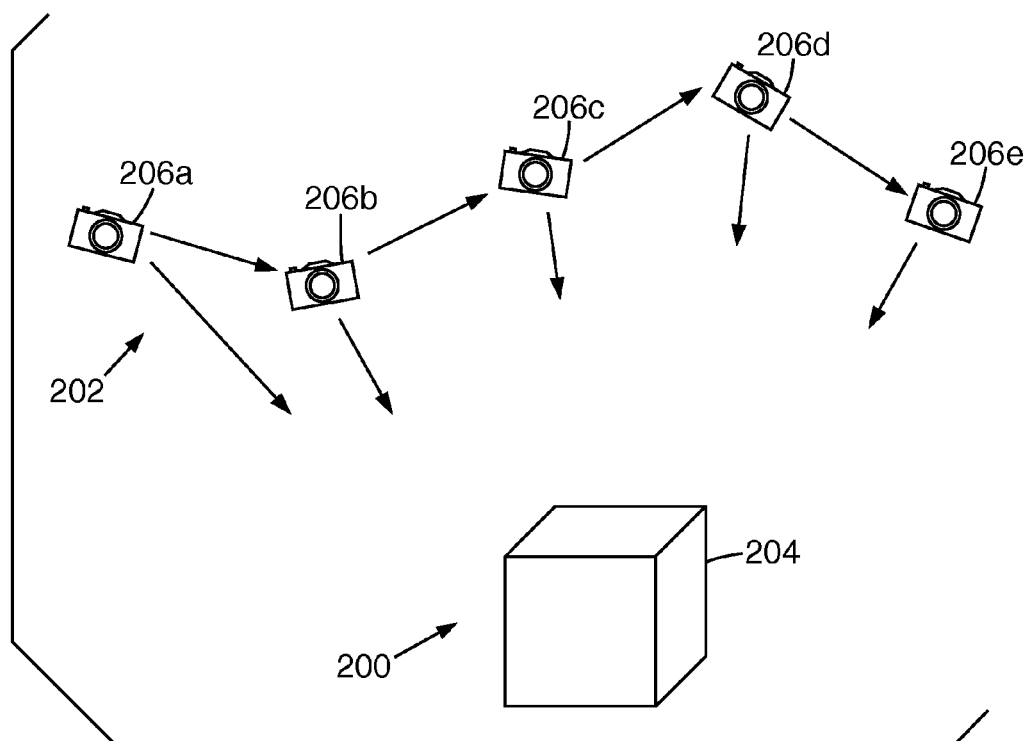
FIG. 2 illustrates a sequence of images captured from a moving camera.

FIG. 2 illustrates a sequence of images captured from a moving camera. In the sequence 200, a camera 202, which may include, for example, any of the cameras 102 described above, may capture an image of a subject 204, which may be, for example, any of the subjects 104 described above, from a number of different positions 206a-206e. While five camera positions are shown in the sequence 200 of FIG. 2, it will be appreciated that more or fewer camera positions may be used consistent with the principles described herein. At each position 206, the camera 202 captures an image set:

$$IS_n\{x_i=(x_i,y_i)^T|i=1,\Lambda,N_n\} \quad [\text{Eq. 1}]$$

of two-dimensional images from which a point cloud:

$$PC_n\{X_i=(X_i,Y_i,Z_i)^T|i=1,\Lambda,N_n\} \quad [\text{Eq. 2}]$$

may be calculated. In general, the three-dimensional point clouds captured from the sequence 200 may be combined into an aggregate point cloud using the techniques described below. It should also be understood that, in certain embodiments, the camera may remain fixed while the subject moves. In such cases, motion of the subject is determined, rather than motion of the camera 202.

Figure 3A:
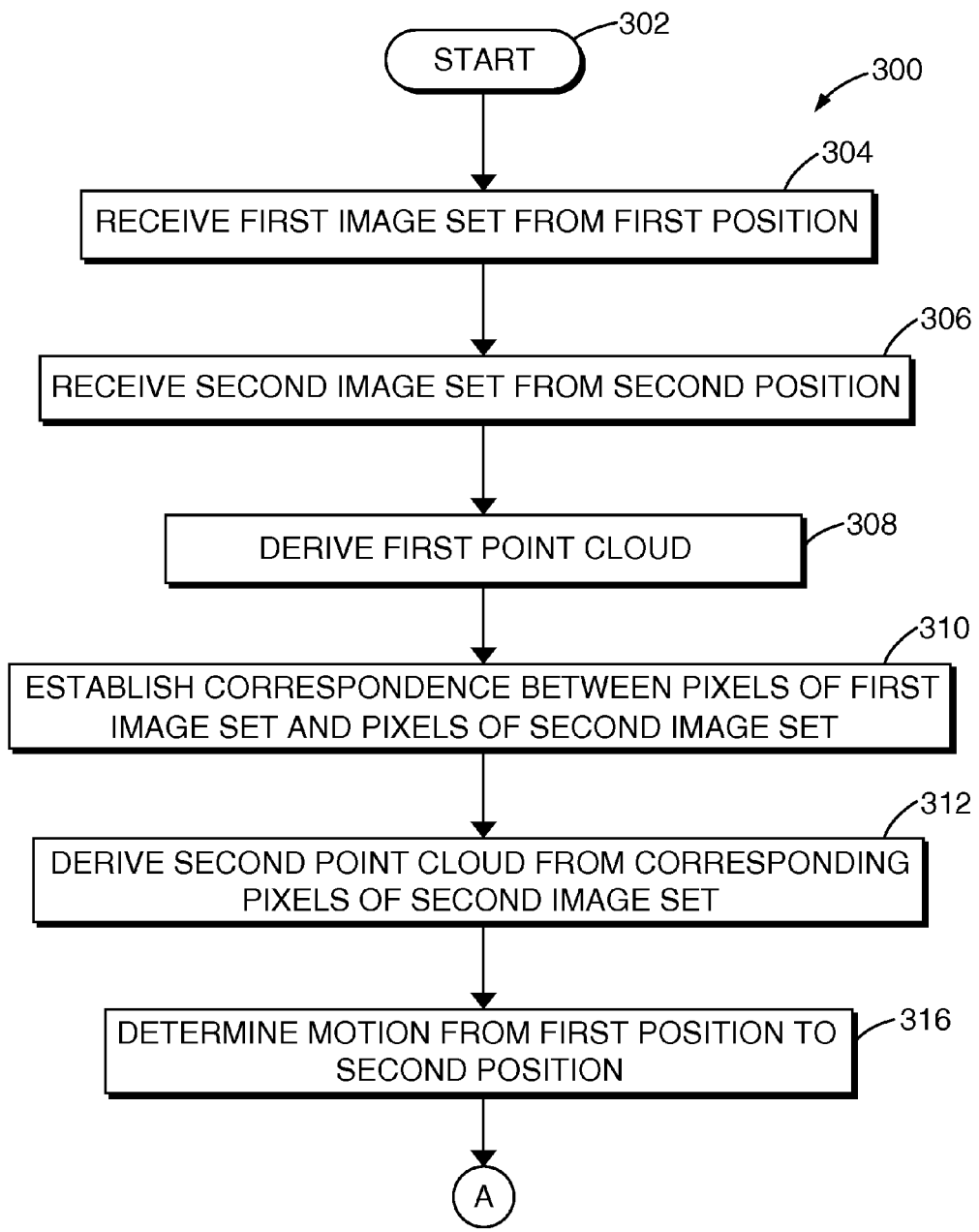
FIGS. 3A and 3B show a flow chart of a process for determining camera motion.
Figure 3B:
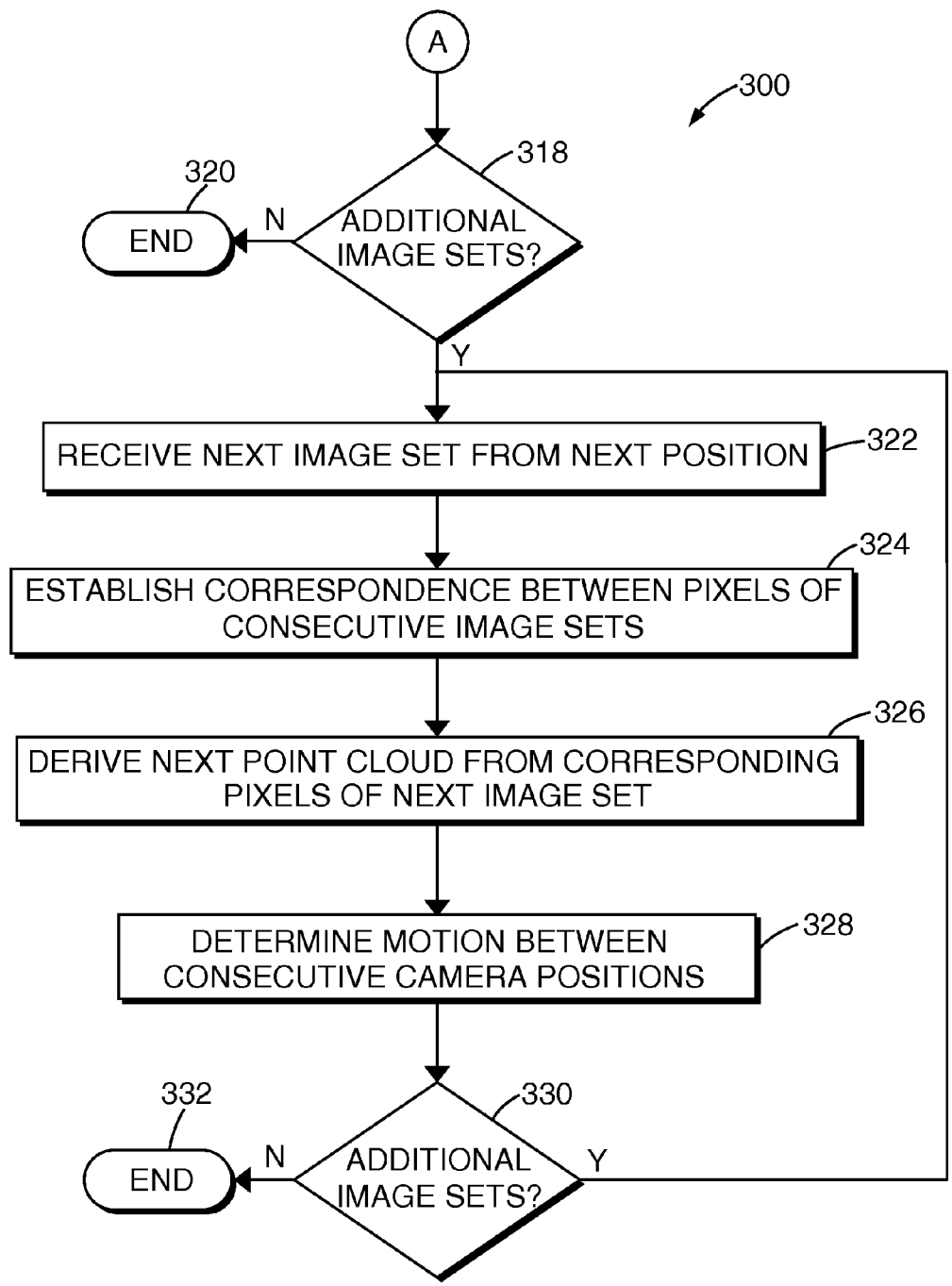

FIGS. 3A and 3B show a flow chart of a process for determining camera motion. The process 300 may be used with the camera systems described generally above.

The process 300 may start 302 by receiving a first image set ($IS_1$) from a camera in a first position 304. A position, as the term is used herein, includes three-dimensional coordinates as well as rotational orientation of a camera. Of course, the "position" from which the camera captures a first image set in a sequence is somewhat arbitrary, so any convenient values may be assigned to the first position relative to, for example, the later acquired second position, the subject being imaged, or some other point of reference, or the first position may be at the origin with zero rotation on all axes.

As shown in step 306, the camera may next receive a second image set ($IS_2$) from a second position. The camera may be moved from the first position to the second position using any automatic, semi-automatic, or manual procedure. For example, the camera may be a handheld imaging device which is moved by hand over and/or around a subject while image sets are captured. Image capture may be triggered, for example, at regular intervals, at irregular intervals (such as upon completion of processing for a previous image set), or at manually triggered intervals, or using some other triggering mechanism.

As shown in step 308, a first point cloud ($PC_1$) may be calculated from the first image set ($IS_1$). A number of techniques may be employed to calculate three-dimensional point values from the image set. For example, stereoscopic matching techniques include probabilistic measures of image similarity such as mutual information or correlation of pixel intensities. Other types of suitable derivations include, for example, optical flow using spatial and/or temporal gradients. As noted above, in a stereoscopic camera configuration, the image set typically includes two images. However, three or more images may be included in an image set using a multi-aperture camera configuration, such as a three or four aperture camera, or similar camera systems. It should also be appreciated that the first point cloud need not include all, or even most, of the points that might be recovered from the image set. The point cloud may, for example, be calculated from a sparse mesh of the image set (relative to the pixel density of the original image set). This arrangement may be particularly suitable for accelerating processing in real time imaging applications. The sparse mesh may be obtained from any subset of pixels in the image set. Regular rectangular grids, for example, are particularly suited to hierarchical methods using subsampling of images. However, other meshes may be used, such as triangular, square, or the like, to select regularly or irregularly spaced pixels within the image set for derivation of a point cloud.

As shown in step 310, correspondence may then be established between pixels of the first image set ($IS_1$) and pixels of the second image set ($IS_2$). In order to reduce computational complexity, correspondence may advantageously be established for a subset of pixels, which may more specifically be the subset or mesh of pixels described above. Correspondence may be established using, for example, correlation-based image matching. Other techniques, such as optical flow, are also known and may be suitably employed, particularly where relative motion between consecutive images is small. In one embodiment using a multi-aperture camera that includes an aperture centered on the camera's optical axis, the on-axis image from each image set may be used for correspondence.

Where the source data is suitably dense, correspondence may be reliably assumed for points selected using, for example, the meshes noted above. However, it will be appreciated that points may be removed from the first point cloud ($PC_1$) where no correspondence can be established, or other quantitative, qualitative, or rule-based reasons exist for doubting the accuracy or value of such points. More generally, many variations and modifications to generation of the point cloud, either through processing of two-dimensional pixel data or selection of three-dimensional points obtained therefrom, may be made without departing from the scope of this disclosure.

As shown in step 312, a second point cloud ($PC_2$) may be derived from pixels of the second image set ($IS_2$), generally using techniques described above with reference to step 308. It will be noted that the second point cloud may be derived only for a subset of pixels from the second image set having corresponding pixels in the first image set, i.e., a subset of pixels for which there are corresponding points in the first point cloud. This technique advantageously permits subsequent registration or transformation processes to be performed on common inter-frame data points for consecutive three-dimensional point clouds. In other embodiments, a full point cloud (e.g., a point cloud that includes additional points that do not have corresponding pixels) may be derived from camera data at the second position, or, stated differently, the second point cloud may be derived independently of the correspondence step(s) above. This may include, for example, recovery for all pixels in the second image set regardless of correspondence between the first and second image sets, which may, for example, permit parallel generation of the first and second point clouds. In such embodiments, a second point cloud ($PC_2$) used for subsequent processing may be selected from the full point cloud based upon the pixel correspondence described above.

As shown in step 316, a motion may be determined from the first camera position to the second camera position. As with other steps described herein, a number of techniques may be employed. In one embodiment, a rigid transformation including a three-dimensional rotation matrix (R) and a three-dimensional translation vector (t) may be computed for N corresponding points of the first and second point clouds by minimizing the fitting residuals, as characterized by the equation:

$$\arg\min_{R,t} \sum_{i=1}^{N} \|RX_i + t - X'_i\|^2 \qquad [\text{Eq. 3}]$$

Alternatively, where a confidence measure can be obtained for each corresponding point, a weighted formulation can be employed for the rigid transformation, where each point, i, is separately weighted with a weighting factor, $w_i$.

$$\arg\min_{R,t} \sum_{i=1}^{N} \|w_i(RX_i + t - X'_i)\|^2 \qquad [\text{Eq. 4}]$$

The expression in Eq. 3 or Eq. 4 has a closed form solution using, for example, a singular value decomposition (as described in K. S. Arun, T. S. Huang and S. D. Blostein, Least-squares fitting of two 3-D point sets, IEEE Transactions on Pattern Analysis and Machine Intelligence, Vol. 9, Issue 5, pp. 698-700, 1987, incorporated herein by reference in its entirety) or an eigenvalue-eigenvector decomposition (as described in Berthold K. P. Horn, Hugh M. Hilden, and Shahriar Negahdaripour, Closed-form solution of absolute orientation using orthonormal matrices. Journal of the Optical Society of America, 5(7): 1127-1135, 1988, incorporated herein by reference in its entirety). More generally, rigid transformation can be based on minimization of an error functions such as a least mean square fit or a robust least mean square fit of point cloud data for two point clouds. Camera motion from the first position to the second position is the inverse of this transformation. It will be appreciated that multiple points are generally required to derive the rigid transformation above, and more particularly, at least three non-colinear points. As a significant advantage, this approach permits calculation of a rigid transformation using points that are known to be present in both point clouds.

As shown in step 318, a determination may be made whether additional image sets are to be captured for, e.g., $PC_3$, $PC_4$, . . . . This determination may be controlled, for example, by user input to the computer described above, such as by selecting a "end acquisition" button or the like, or may be controlled automatically according to, e.g., memory capacity limits, a preset recording duration, or any other suitable criterion. If no additional image sets are to be acquired, the process 300 may end 320.

If additional images sets are to be acquired, the process 300 may proceed to step 322 where a next image set may be received from a next position, as generally described above. As shown in step 324, pixel correspondences may be established between the current and previous image sets, again as generally described above. As shown in step 326, a point cloud may be derived for the next image set using the correspondences established in step 324, again as generally described above. As shown in step 328, motion between consecutive positions may be determined using point cloud data from consecutive positions, again as described above.

As shown in step 330, a determination may be made whether additional image sets are to be captured for, e.g., additional point clouds. This determination may be controlled, for example, by user input to the computer described above, such as by selecting a "end acquisition" button or the like, or may be controlled automatically according to, e.g., memory capacity limits, a preset recording duration, or any other suitable criterion. If additional image sets are to be acquired, the process 300 may return to step 322 where a next consecutive image set may be captured, and so on. Thus the process may be repeated for any number of consecutive image sets, subject to processing and storage limitations of the computer and camera.

If no additional image sets are to be acquired, the process 300 may proceed to the end 332. The entire image sequence and/or camera path may be stored on the computer or other suitable storage device, such as network attached storage, external mass storage device, or the like. In addition, an aggregate point cloud may be formed by concatenating data from sequential image set pairs, and the aggregate point cloud may be stored in addition to, or instead of, the camera path, image set, and or point cloud data for data from various camera positions.

It will be appreciated that the above steps may be varied, such as by using optical flow techniques to determine correspondence between pixels in adjacent image sets, and that the order of steps may be changed, such as by deriving the first point cloud before acquiring the second image set. Additionally, certain steps may be added or omitted, or multiple steps may be combined. Similarly, in certain computing environments some steps may be performed in parallel, or certain steps may be distributed among more than one process or processor. Also, as noted above, in certain embodiments the camera may remain in a fixed position, and motion may be determined for one or more subjects moving within the image plane.

In other embodiments, a first point cloud and a second point cloud may be derived from first and second image sets prior to any inter-frame processing. Significant processing advantages may still be realized by performing subsequent registration or transformation calculation steps on a subset of corresponding points, as determined using, for example, the meshes described above, along with an analysis of two-dimensional pixel data from which the point clouds are derived. Thus in one embodiment, a method disclosed herein may include deriving a first point cloud from a first image set, deriving a second point cloud from a second image set, and identifying a number of corresponding points between the first point cloud and the second point cloud using two dimensional data from the first and second image sets. Subsequent processing, such as calculating a rigid transformation, deriving camera motion therefrom, or registering the point clouds relative to one another, may be performed on the corresponding points. In various implementations, the point clouds may be explicitly trimmed to contain only the corresponding points, or the subsequent processing steps may be performed for an identified subset of points within the point cloud(s). Thus, it will be appreciated that processing of corresponding points in a number of point clouds may be mechanically addressed in a number of ways.

In other embodiments, correspondence between pixels in two dimensional image data may be determined prior to generation of any point cloud data for either camera location.

All such variations as would be recognized by one of ordinary skill in the art and consistent with the claims that follow this description, are intended to fall within the scope of this disclosure.

It will be appreciated that the above process may be realized in hardware, software, or any combination of these suitable for the three-dimensional imaging techniques described herein. The process may be realized in one or more microprocessors, microcontrollers, embedded microcontrollers, programmable digital signal processors or other programmable device, along with internal and/or external memory. The process may also, or instead, include an application specific integrated circuit, a programmable gate array, programmable array logic, or any other device that may be configured to process electronic signals. It will further be appreciated that the process may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across the camera and/or computer in a number of ways, or all of the functionality may be integrated into a dedicated, standalone image capture device. All such permutations and combinations are intended to fall within the scope of the present disclosure.

The method described above may be supplemented with additional techniques or processing steps, such as the failure recovery mechanism and forward-reverse transformation techniques described below.

Figure 4:
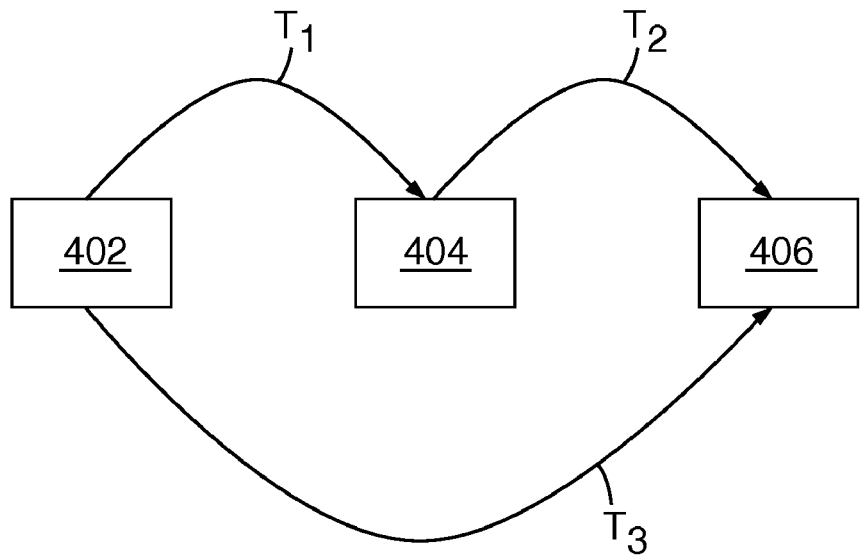
FIG. 4 illustrates a failure recovery mechanism.

FIG. 4 illustrates a failure recovery mechanism. In a series of consecutive images, 402, 404, 406 representing point clouds from a number of camera positions, each point cloud may be related to its adjacent sequential point cloud by a forward transformation, $T_1$, $T_2$. From time to time, a forward transformation may fail to accurately recover camera motion for corresponding point clouds. Thus, in the example of FIG. 4, the second transformation $T_2$ may fail to recover camera motion from the second consecutive image 404 to the third consecutive image 406. In such instances, camera motion between the adjacent frames may be recovered, provided a rigid third transformation $T_3$ from the first camera location to the third camera location can be obtained. In such cases the first forward transformation may be calculated as the inner product of the inverse of the first forward transformation $T_1$ and the third transformation $T_3$:

$$T_2 = T_1^{-1} \cdot T_3 \quad [\text{Eq. 5}]$$

In a more general application of this error recovery approach, frames may be dropped, for example to increase processing speed, without loss of camera motion or point cloud data, provided rigid transformations can be calculated to span the dropped images. Thus in one embodiment, processing speed may be improved by dropping frames at any suitable rate that continues to permit recovery of camera motion across the remaining frames.

Figure 5:
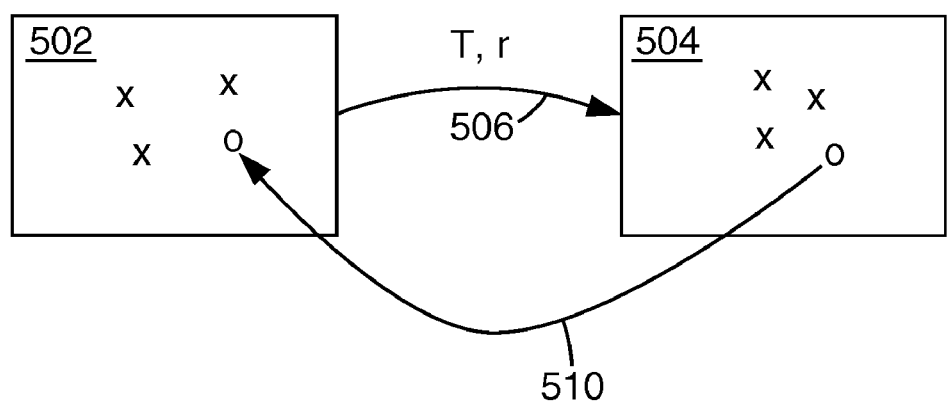
FIG. 5 illustrates an enhanced registration technique.

FIG. 5 illustrates an enhanced registration technique. In this technique, the point clouds, $PC_1$ and $PC_2$, may be supplemented after registration with additional corresponding points from the image sets. That is, once a rigid transformation is characterized between corresponding points (denoted as "x" in FIG. 5) in the point clouds 502, 504, additional corresponding points (denoted as "o" in FIG. 5) may be recovered with relatively little additional computation. As shown in FIG. 5, the corresponding points, x, between the first point cloud and the second point cloud may be related through a transformation 506, T, r. In addition to confirming the registration through a reverse transformation 510, additional corresponding points, o, may be recovered in the reverse operation and may be used to supplement the point clouds.

While the invention has been disclosed in connection with certain preferred embodiments, other embodiments will be recognized by those of ordinary skill in the art, and all such variations, modifications, and substitutions are intended to fall within the scope of this disclosure. Thus, the invention is to be understood with reference to the following claims, which are to be interpreted in the broadest sense allowable by law.

What is claimed is:

1. A computer program product embodied in a non-transitory computer readable medium comprising computer code which, when executed on one or more processors, performs the following steps:

receiving a first image set from a camera, the first image set including a first plurality of two-dimensional views of a subject from a first position of the camera, wherein the subject is substantially larger than an image plane of the first image set;

receiving a second image set from the camera, the second image set including a second plurality of two-dimensional views of a subject from a second position of the camera;

deriving a first point cloud from the first image set;

identifying a number of corresponding pixels between a number of pixels of one of the first plurality of two-dimensional views and a number of pixels of one of the second plurality of two-dimensional views;

deriving a second point cloud from the number of corresponding pixels of the second image set;

determining a motion of the camera from the first position to the second position using the first point cloud and the second point cloud; and repeating steps of receiving the first image set, receiving the second image set, deriving the first point cloud, identifying the number of corresponding pixels, deriving the second point cloud, and determining the motion, for a plurality of consecutive three-dimensional images whereby an aggregate point cloud is constructed for the subject.

2. The computer program product of claim 1 wherein the subject is fixed, the first position and the second position being different positions of a moving camera the camera.

3. The computer program product of claim 1 wherein a the camera is fixed and the subject moves, the first position and the second position being different positions of the subject.

4. The computer program product of claim 1 wherein determining motion includes determining a rigid transformation from the first point cloud to the second point cloud.

5. The computer program product of claim 4 wherein determining motion includes weighting one or more points of the point clouds according to confidence.

6. The computer program product of claim 1 wherein the first point cloud is derived from a number of pixels of the first image set using stereo matching.

7. The computer program product of claim 1 wherein the motion includes a change in at least one of a position or an orientation.

8. The computer program product of claim 1 wherein the first point cloud includes a subset of points from the first image set.

9. The computer program product of claim 1 wherein the first image set and the second image set are obtained from camera is a multi-aperture camera.

10. The computer program product of claim 1 wherein the first image set and the second image set are obtained from camera is a camera system including a plurality of separate cameras in a fixed relationship to one another.

11. The computer program product of claim 1 wherein the subject includes a body part.

12. The computer program product of claim 11 wherein the body part includes one or more of a nose, an ear, a tooth, or a plurality of teeth.

13. The computer program product of claim 1 wherein the subject includes a dental model.

\* \* \* \* \*

UNITED STATES PATENT AND TRADEMARK OFFICE
CERTIFICATE OF CORRECTION

PATENT NO. : 7,956,862 B2  Page 1 of 1
APPLICATION NO. : 12/568124
DATED : June 7, 2011
INVENTOR(S) : Tong Zhang It is certified that error appears in the above-identified patent and that said Letters Patent is hereby corrected as shown below:

Column 12
Claim 2, Line 58, delete "camera the camera." and insert -- camera. --, therefor.

Column 12
Claim 3, Line 59, delete "a the" and insert -- the --, therefor.

Signed and Sealed this
Twentieth Day of December, 2011

David J. Kappos
*Director of the United States Patent and Trademark Office*